(12) United States Patent
Yu et al.

(10) Patent No.: US 8,689,918 B2
(45) Date of Patent: Apr. 8, 2014

(54) ATTACH AND DETACH DEVICE OF BATTERY FOR ELECTRIC VEHICLE

(75) Inventors: Chi-Man Yu, Bucheon-si (KR); Joo-Sub Sim, Goyang-si (KR); Yong-Geu Park, Incheon (KR); Woong-Sung Jang, Bucheon-si (KR); Yun-ha Kim, Seoul (KR); Jun-Seok Park, Seoul (KR); Woong-Chul Choi, Seoul (KR); Jay-Il Jeong, Seoul (KR)

(73) Assignees: Motex Products Co., Ltd., Bucheon-Si, Gyeonggi-Do (KR); KOOKMIN UNIV. Industry Academy Cooperation Foundation, Seoul (KR); Industry-Univ. Cooperation Foundation of Korea Aerospace Univ., Goyang-Si, Gyeonggi-Do (KR)

( * ) Notice: Subject to any disclaimer, the term of this patent is extended or adjusted under 35 U.S.C. 154(b) by 0 days.

(21) Appl. No.: 13/532,026

(22) Filed: Jun. 25, 2012

(65) Prior Publication Data

US 2013/0156533 A1    Jun. 20, 2013

(30) Foreign Application Priority Data

Dec. 16, 2011    (KR) ........................ 10-2011-0136670

(51) Int. Cl.
*B65G 67/02*    (2006.01)
(52) U.S. Cl.
USPC ........................... 180/68.5; 320/109; 414/283

(58) Field of Classification Search
USPC .............. 180/2.1, 65.1, 65.21, 68.5; 320/109; 414/281, 282, 283
See application file for complete search history.

(56) References Cited

U.S. PATENT DOCUMENTS

| | | | | |
|---|---|---|---|---|
| 4,087,895 A | * | 5/1978 | Etienne | 29/252 |
| 5,612,606 A | * | 3/1997 | Guimarin et al. | 320/109 |
| 5,998,963 A | * | 12/1999 | Aarseth | 320/109 |
| 7,413,045 B2 | * | 8/2008 | Tien | 180/68.5 |
| 2010/0145717 A1 | * | 6/2010 | Hoeltzel | 705/1.1 |
| 2013/0037337 A1 | * | 2/2013 | Auer et al. | 180/68.5 |

* cited by examiner

*Primary Examiner* — John Walters
(74) *Attorney, Agent, or Firm* — Sherr & Jiang, PLLC

(57) ABSTRACT

Disclosed is an electric vehicle battery attaching/detaching device including a battery mounting unit formed on an electric vehicle to detachably mount a battery and provided with a connector pin module adapted to be lifted/lowered by a lifting/lowering means; a loader having a plurality of battery stands, each battery stand being adapted to detachably mount a fully-charged battery to be exchanged with the battery mounted on the battery mounting unit; and a battery attaching/detaching unit adapted to move along X-axis, Y-axis, and Z-axis between the battery mounting unit and the battery stand by means of a movement device, detach a battery mounted on the battery mounting unit or the battery stand, and exchange/mount the battery on the battery stand or the battery mounting unit.

4 Claims, 15 Drawing Sheets

ATTACH AND DETACH DEVICE OF BATTERY FOR ELECTRIC VEHICLE

CROSS REFERENCE TO PRIOR APPLICATIONS

The present application claims priority under 35 U.S.C. §119 to Korean Patent Application No. 10-2011-0136670 (filed on Dec. 16, 2011), which is hereby incorporated by reference in its entirety.

TECHNICAL FIELD

The present invention relates to a device for attaching/detaching a battery for an electric vehicle, and more particularly, to an electric vehicle battery attaching/detaching device adapted to attach/detach and exchange a battery, which is mounted on a battery mounting unit of an electric vehicle and which is about to be discharged, and a battery, charging of which is completed and which is loaded on a separate loader.

BACKGROUND ART

In general, vehicles commonly use, as their fuel, petroleum (e.g. gasoline, light oil) and gases (e.g. LPG, LNG), the deposits of which are limited, the prices of which are on the rise, and which cause environmental contamination. Therefore, there has been an increasing demand for alternative fuels.

Electric batteries have recently been commercialized to a considerable extent as alternative vehicle fuels, but they need to be charged for a long period of time, which degrades efficiency and makes their widespread use difficult.

DISCLOSURE

Technical Problem

Therefore, the present invention has been made in view of the above-mentioned problems, and an aspect of the present invention is to provide an electric vehicle battery attaching/detaching device which, instead of charging an electric vehicle battery for a long period of time, automatically and conveniently exchanges a nearly discharged battery with a fully-charged battery within a short period of time.

Another aspect of the present invention is to provide an electric vehicle battery attaching/detaching device which, in the case of a bus, has a plurality of fully-charged batteries arranged at a specific bus stop, for example, and which easily detaches and exchanges one of the fully-charged batteries with a nearly discharged battery of the bus.

Another aspect of the present invention is to provide an electric vehicle battery attaching/detaching device capable of guaranteeing that batteries are easily attached/detached even if the battery mounting unit of an electric vehicle is not positioned on the same vertical line with the battery attaching/detaching unit of a movement device but is displaced to some extent for various reasons (tire air pressure difference, concentrated distribution of passengers, the driver's difficulty in stopping the electric vehicle at the accurate exchange location, etc.).

Another aspect of the present invention is to provide an electric vehicle battery attaching/detaching device configured in such manner that, when a battery is seated and set at the accurate location on the battery mounting unit, connector pins installed on the battery mounting unit so as to ascend/descend are controlled to ascend and inserted into connector pin holes of the battery to establish electric connection, and the connector pins do not escape from the connector pin holes even due to vibrations occurring when the electric vehicle is running, but maintain stable electric connection.

Technical Solution

In accordance with an aspect of the present invention, there is provided an electric vehicle battery attaching/detaching device including a battery mounting unit formed on an electric vehicle to detachably mount a battery and provided with a connector pin module adapted to be lifted/lowered by a lifting/lowering means; a loader having a plurality of battery stands, each battery stand being adapted to detachably mount a fully-charged battery to be exchanged with the battery mounted on the battery mounting unit; and a battery attaching/detaching unit adapted to move along X-axis, Y-axis, and Z-axis between the battery mounting unit and the battery stand by means of a movement device, detach a battery mounted on the battery mounting unit or the battery stand, and exchange/mount the battery on the battery stand or the battery mounting unit.

Preferably, the battery has an introduction space unit formed on one side of a bottom surface of the battery so that the connector pin module is introduced when lifted and a connector pin hole formed on a surface of the introduction space unit so that a connector pin of the connector pin module is inserted.

Preferably, grasping protrusions are formed on both sides of the connector pin, a fitting groove being formed on a circumferential surface of each grasping protrusion, and grasping holes are formed on both sides of the connector pin hole so that the grasping protrusions are fitted, a leaf spring being installed on a circumferential surface of each grasping hole to be fitted into the fitting groove.

The lifting/lowering means may include an actuator adapted to operate in response to an electric signal; a piston adapted to be moved by operation of the actuator; a slide member connected to an end of the piston so that movement of the slide member is interlinked with movement of the piston; and links having ends connected to the slide member, respectively, so that, when the slide member moves, the links rotate from a horizontal direction to a vertical direction or from a vertical direction to a horizontal direction and lift/lower the connector pin module.

Advantageous Effects

The electric vehicle battery attaching/detaching device according to the present invention is advantageous as follows: a nearly discharged battery mounted on the battery mounting unit of an electric vehicle is easily exchanged with one of fully-charged batteries on the loader installed at a bus stop, for example, within a short period of time, thereby improving efficiency substantially.

The electric vehicle battery attaching/detaching device guarantees that batteries are easily attached/detached to/from the battery mounting unit even if the battery mounting unit of an electric vehicle is not positioned on the same vertical line with the battery attaching/detaching unit of a movement device but is displaced to some extent for various reasons (tire air pressure difference, concentrated distribution of passengers, the driver's difficulty in stopping the electric vehicle at the accurate exchange location, etc.).

Furthermore, connector pins installed on the battery mounting unit so as to ascend/descend are controlled to ascend and inserted into connector pin holes of the battery to establish electric connection, only when the battery is seated and set at the accurate location on the battery mounting unit, thereby guaranteeing stable electric connection between the battery mounting unit and the battery.

In addition, the connector pins do not escape from the connector pin holes even due to vibrations occurring when the electric vehicle is running, thereby guaranteeing stable electric connection.

MODE FOR CARRYING OUT THE INVENTION

Hereinafter, preferred embodiments of the present invention will be described in detail with reference to the accompanying drawings.

First Embodiment

Figure 1:
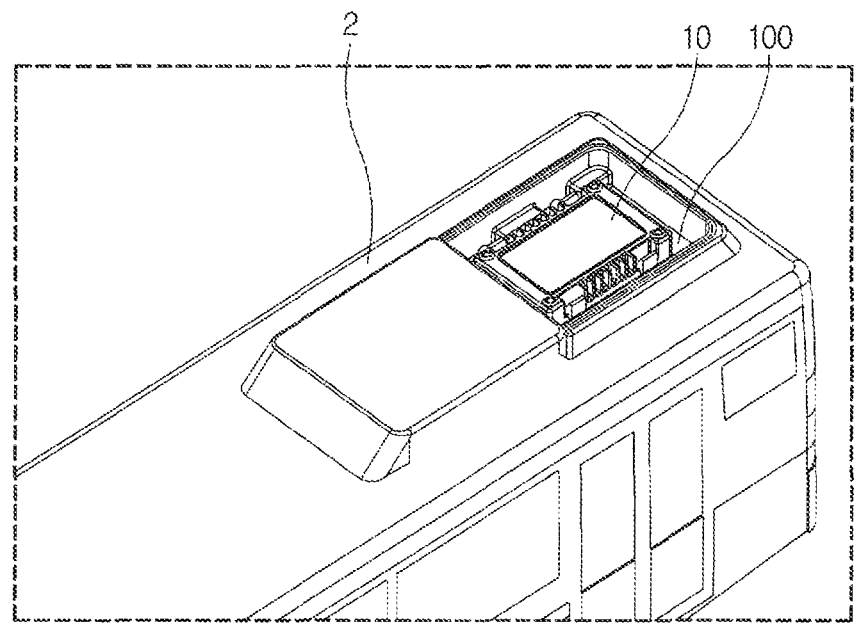
FIG. 1 is a partial perspective view illustrating a battery installed on one side of the upper surface of an electric vehicle to use an electric vehicle battery attaching/detaching device according to a first embodiment of the present invention.
Figure 2:
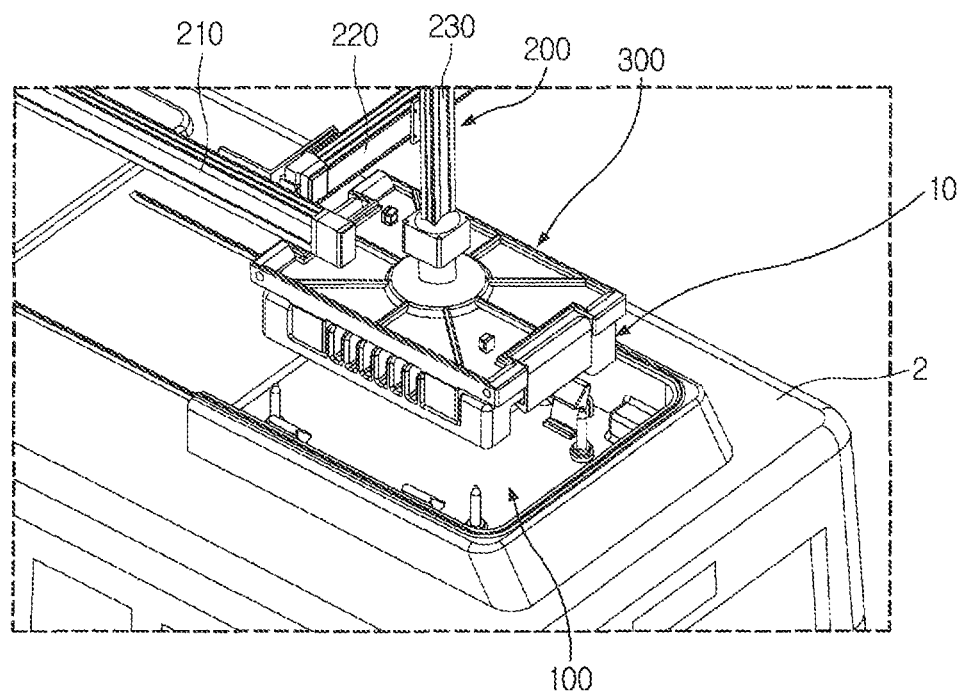
FIG. 2 is a partial perspective view illustrating a process of picking up a battery mounted on an electric vehicle using a electric vehicle battery attaching/detaching device according to the first embodiment of the present invention shown in FIG. 1.
Figure 3:
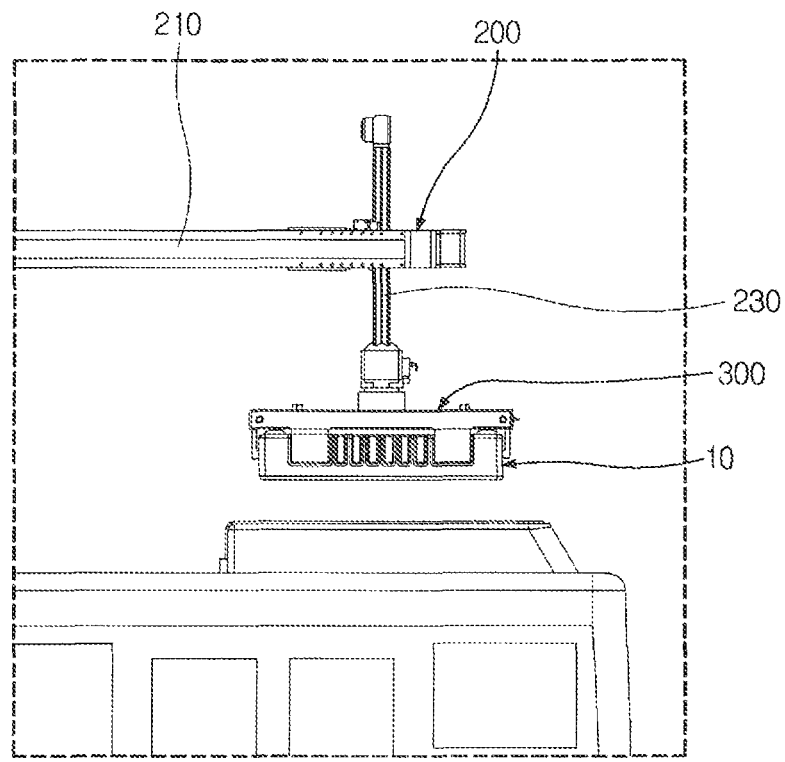
FIG. 3 is a front view of FIG. 2.
Figure 4:
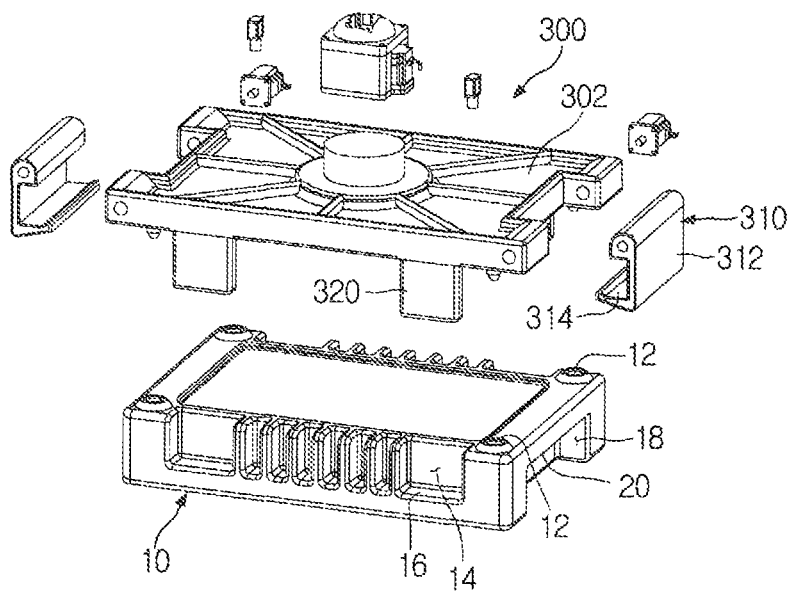
FIG. 4 is an exploded perspective view of the electric vehicle battery attaching/detaching device according to the first embodiment of the present invention.

FIG. 1 is a partial perspective view illustrating a battery installed on one'side of the upper surface of an electric vehicle to use an electric vehicle battery attaching/detaching device according to a first embodiment of the present invention; FIG. 2 is a partial perspective view illustrating a process of picking up a battery mounted on an electric vehicle using the electric vehicle battery attaching/detaching device according to the first embodiment of the present invention shown in FIG. 1; FIG. 3 is a front view of FIG. 2; and FIG. 4 is an exploded perspective view of the electric vehicle battery attaching/detaching device according to the first embodiment of the present invention.

As shown, the electric vehicle battery attaching/detaching device according to a first embodiment of the present invention includes a loader (not shown) having a plurality of batteries, charging of which has been completed (hereinafter, referred to as fully-charged batteries), loaded thereon; an electric vehicle battery mounting unit 100; and a battery attaching/detaching unit 300 adapted to move between the battery mounting unit 100 and the loader along X-axis, Y-axis, and Z-axis by means of a movement device 200, detach a battery 10 mounted on the battery mounting unit 100 or the loader, and again exchange/mount the battery 10 on the loader or the battery mounting unit 100.

It will be assumed in the description of the first embodiment of the present invention that the electric vehicle is a bus 2.

The battery attaching/detaching unit 300 is supposed to move along X-axis, Y-axis, and Z-axis with regard to the loader, which has a plurality of fully-charged batteries loaded thereon, and the battery mounting unit 100 of the bus 2. To this end, the battery mounting unit 100 is preferably installed on top of the bus 2, and the loader of fully-charged batteries is preferably positioned higher than the bus 2.

The battery attaching/detaching unit 300 is moved by the movement unit 200 along X-axis, Y-axis, and Z-axis with regard to the loader and the battery mounting unit 100 of the bus 2. Therefore, the movement unit 200 includes a pair of fixed guide rails 210 installed on the loader horizontally, a variable guide rail 220 installed on the fixed guide rails 210 in a perpendicular direction and adapted to move horizontally along X-axis or Y-axis, and a movable rail 230 adapted to move horizontally along Y-axis or X-axis with regard to the variable guide rail 220 and move vertically along Z-axis. The battery attaching/detaching unit 300 is preferably installed on the lower end of the movable rail 230.

Particularly, the variable guide rail 220 is adapted to move horizontally along X-axis or Y-axis with regard to the pair of fixed guide rails 210, which are installed in parallel on the loader having a plurality of fully-charged batteries loaded thereon. The movable rail 230 is adapted to move horizontally along Y-axis or X-axis with regard to the variable guide rail 220, as well as move vertically along Z-axis. Therefore, the battery attaching/detaching unit 300, which is installed on the lower end of the movable rail 230, can pick up and exchange a fully-charged battery loaded on the loader and a battery about to be discharged (hereinafter, referred to as a discharged battery) mounted on the battery mounting unit 100 of the bus 2.

The battery attaching/detaching unit 300 according to the first embodiment of the present invention is supposed to move the battery 10 along X-axis, Y-axis, and Z-axis, making it crucial to safely grasp the battery 10. The battery 10 also needs to be stably retained on the battery mounting unit 100 of the bus 2 and on each battery support (not shown) of the loader. Therefore, the battery 10 is structured to be stably retained on the battery mounting unit 100 and on each battery stand of the loader, as well as on the battery attaching/detaching unit 300. Such a structure of the battery 10, which is applied to the present invention, will now be described.

The battery 10, which is applied to the battery attaching/detaching device according to the first embodiment of the present invention, has coupling holes 12 formed near respective corners so that it is retained in the accurate position on the battery mounting unit 100 of the bus 2 or on a battery stand of the loader; upper surface incisions 14 formed on both lateral surfaces and provided with engaging ledges 16 at a predetermined height from the bottom portion, respectively; and lower surface incisions 18 formed on front and rear surfaces and provided with engaging ledges 20 at a predetermined height from the top portion, respectively.

The battery 10, which has the above-mentioned construction, is mounted while being retained by the battery mounting unit 100 or the battery stand, as will be described later.

The battery mounting unit 100 or the battery stand has a bottom portion 102 of a predetermined area, on which the battery 10 is seated and supported. The bottom portion 102 has engaging rods 104 adapted to be inserted into the coupling holes 12 formed on respective corners of the battery 10. In addition, grasping holders 106 are formed to engage with the engaging ledges 16 of the upper surface incisions 14 of the battery 10 or disengage from them by means of elastic force.

The engaging rods 104 formed on the battery mounting unit 100 or the battery stand are positioned to vertically correspond to the coupling holes 12 of the battery 10 and have the corresponding number. The grasping holders 106 also have a position and a number corresponding to those of the upper surface incisions 14 of the battery 10.

The grasping holders 106 are adapted to make hinge rotation in the forward/backward direction by means of elastic members 112 (e.g. springs). Each grasping holder 106 has a stepped portion 108 adapted to horizontally engage with a corresponding engaging ledge 16 formed on the upper surface incision 14 of the battery 10 and a slanted surface 110 slanted upwards from the inner end surface of the stepped portion 108 in the outward direction.

Figure 5:
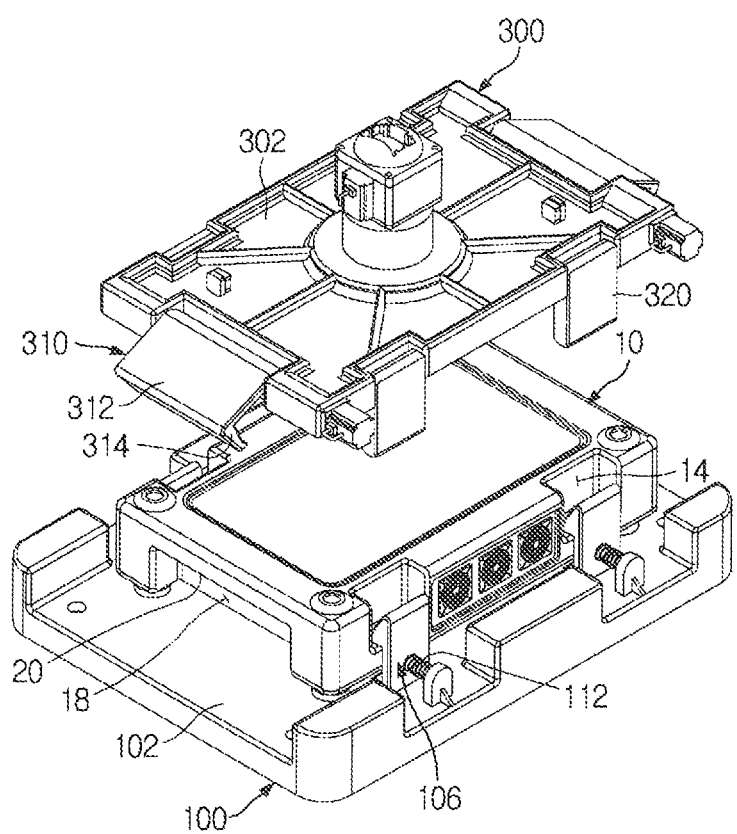
FIGS. 5-13 are perspective and front views illustrating successive processes of attaching/detaching and exchanging a battery using the electric vehicle battery attaching/detaching device according to the first embodiment of the present invention.

Therefore, when the battery 10 is mounted on the battery mounting unit 100 or the battery stand, as shown in FIG. 5, the engaging rods 104 remain inserted into the coupling holes 12 of the battery 10 to prevent the battery 10 from moving horizontally forwards/backwards/leftwards/rightwards. In addition, the stepped portions 108 of the grasping holders 106 horizontally engage with the engaging ledges 16 of the upper surface incisions 14 of the battery 10 and prevent the battery 10 from moving vertically upwards/downwards, so that the battery 10 remain grasped and retained.

It is to be noted that, although it has been assumed in the above description that the battery mounting unit 100 and the battery stand have the same construction and thus are provided with engaging rods 104 and grasping holders 106, respectively, sole construction of the bottom portion 102 and the engaging rods 104 may be sufficient, with the grasping holders 106 omitted, because the battery mounting unit 100 of the bus 2 is supposed to constrain the movement of the battery 10 in forward/backward/leftward/rightward and upward/downward directions as the bus 2 is running, while the battery stand of the loader is only supposed to retain the battery in place.

The battery attaching/detaching unit 300, as described above, is installed on the lower end of the movable rail 230 to move along X-axis, Y-axis, and Z-axis. The battery attaching/detaching unit 300 includes a main unit 302 shaped and sized in conformity with the battery 10; grasping units 310 formed on front and rear surfaces of the main unit 302, respectively, and adapted to make hinge rotation vertically and horizontally in response to electric signals; and disengaging units 320 formed on left and right surfaces of the main unit 302, respectively, and adapted to make hinge rotation vertically and horizontally in response, to electric signals.

The grasping units 310 are positioned to vertically correspond to the lower surface incisions 18 of the battery 10 and have the corresponding number. Each grasping unit 310 includes a vertical unit 312 adapted to make hinge rotation vertically or horizontally in response to an electric signal and a horizontal unit 314 extending perpendicular to an end of the vertical unit 312. The horizontal units 314, when the grasping units 310 are folded, horizontally engage with the engaging ledges 20 formed on the lower surface incisions 18 of the battery 10 and thus grasp the battery 10.

The disengaging units 320 are also positioned to vertically correspond to the upper surface incisions 14 of the battery 10 and the grasping holders 106 of the battery mounting unit 100 or the battery stand and have the corresponding number.

A process of exchanging a battery, which is retained and mounted on the battery mounting unit 100 of the bus 2 or the battery stand of the loader, using the battery attaching/detaching device of the above-mentioned configuration will now be described with reference to FIGS. 5-13.

It is to be noted that the battery mounting unit 100 of the bus 2 and the battery stand formed on the loader have the same structure, as mentioned above, meaning that the structure that mounts a battery 10 in FIGS. 5-13 is either the battery mounting unit 100 of the bus 2 or the battery stand formed on the loader, but the following description will be limited to the battery mounting unit 100 of the bus 2, for convenience of description.

Initially, as shown in FIG. 5, a battery 10 is mounted and retained on the battery mounting unit 100 of the bus 2.

Particularly, the engaging rods 104, which protrude from the bottom portion 102 of the battery mounting unit 100, are inserted vertically into the coupling holes 12 of the battery 10 to prevent the battery 10 from moving forwards/backwards/leftwards/rightwards. In addition, the grasping holders 106 of the battery mounting unit 100 are maintained upright by the elastic members (springs) 112, so that the stepped portions 108 of the grasping holders 106 remain seated horizontally on and engaged with the upper portions of the engaging ledges 16 of the upper surface incisions 14 of the battery 10, which remains retained and mounted without moving vertically.

In this state, the battery attaching/detaching unit 300 is positioned on the same vertical line with the battery mounting unit 100 by the movement device 200. Particularly, the variable guide rail 220 moves horizontally along X-axis or Y-axis with regard to the fixed guide rails 210 of the loader, and the movable rail 230 moves horizontally along Y-axis or X-axis with regard to the variable guide rail 220 to be positioned on the same vertical line with the battery mounting unit 100.

The grasping units 310 of the battery attaching/detaching unit 300 are unfolded outwards in response to electric signals; the disengaging units 320 are folded inwards into a vertical condition in response to electric signals; and the movable rail 230 descends along Z-axis with regard to the variable guide rail 220. As a result, the battery 10 is separated from the battery mounting unit 100 and then grasped.

Figure 6:
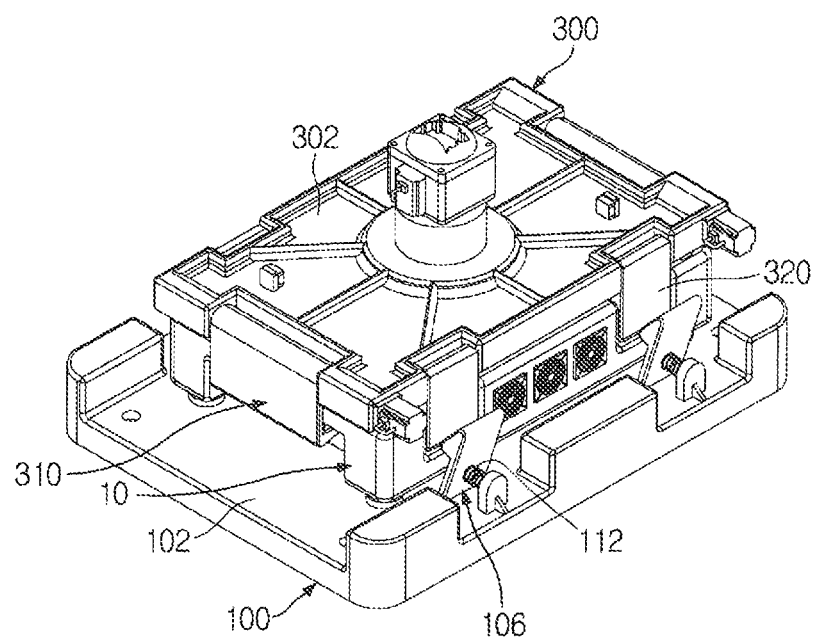
Figure 7:
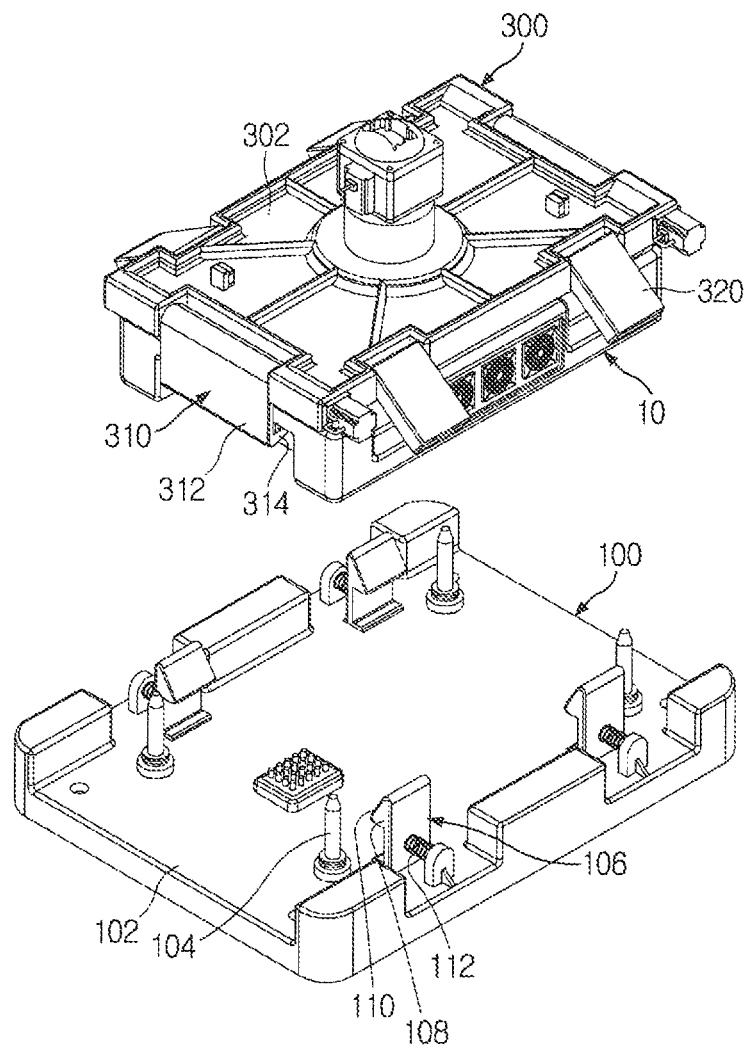

Specifically, as shown in FIGS. 6 and 7, when the battery attaching/detaching unit 300 descends, the disengaging units 320 slide through the slanted surfaces 110 of the grasping holders 106 of the battery mounting unit 100 and enter into the upper surface incisions 14 of the battery 10. Then, the grasping holders 106 of the battery mounting unit 100 unfold outwards while compressing the elastic members 112 and thus release the battery 10 from the vertical engagement.

Next, the grasping units 310 of the battery attaching/detaching unit 300 fold inwards into a vertical condition in response to electric signals, so that the horizontal portions 314 of the grasping unit 310 enter into the lower surface incisions 18 of the battery 10 and horizontally engage beneath the engaging ledges 20 of the lower surface incisions 18.

In this state, the movable rail 230 is raised along Z-axis with regard to the variable guide rail 220 so that the battery attaching/detaching unit 300 ascends together. The battery 10, which is engaged and grasped by the grasping portions 310 of the battery attaching/detaching unit 300, ascends simultaneously.

The engaging rods 104 of the battery mounting unit 100, which are vertically inserted into the coupling holes 12 of the battery 10, do not interfere with the rising battery 10. When the battery 10 rises together with the battery attaching/detaching unit 300, the grasping holders 106 of the battery mounting unit 100 are rotated to the original condition (vertical condition) by restoring force from the elastic members 112.

As such, the battery attaching/detaching unit 300 grasps the battery 10 and ascends along Z-axis; the movable rail 230 horizontally moves along Y-axis or X-axis with regard to the variable guide rail 220; the variable guide rail 220 horizontally moves along X-axis or Y-axis with regard to the fixed guide rails 210 to be positioned on the same vertical line with the battery stand of the loader; and the movable rail 230 again descends along Z-axis to mount the battery 10 on the battery stand.

It is to be noted that the process of mounting the battery 10 on the battery stand of the loader by the battery attaching/detaching unit 300 is identical to the process of mounting the battery 10 on the battery mounting unit 100 of the bus 2, as will be described later.

Next, the movable rail 230 moves along X-axis/Y-axis/Z-axis so that the battery attaching/detaching unit 300 picks up a fully-charged battery, which is mounted on another battery stand of the loader, through the same process as that of picking up a battery 10 from the battery mounting unit 100 of the bus 2, as described above, and the movable rail 230 again moves along X-axis/Y-axis/Z-axis so that the battery attaching/detaching unit 300 is positioned on the same vertical line on top of the battery mounting unit 100 of the bus 2.

Figure 8:
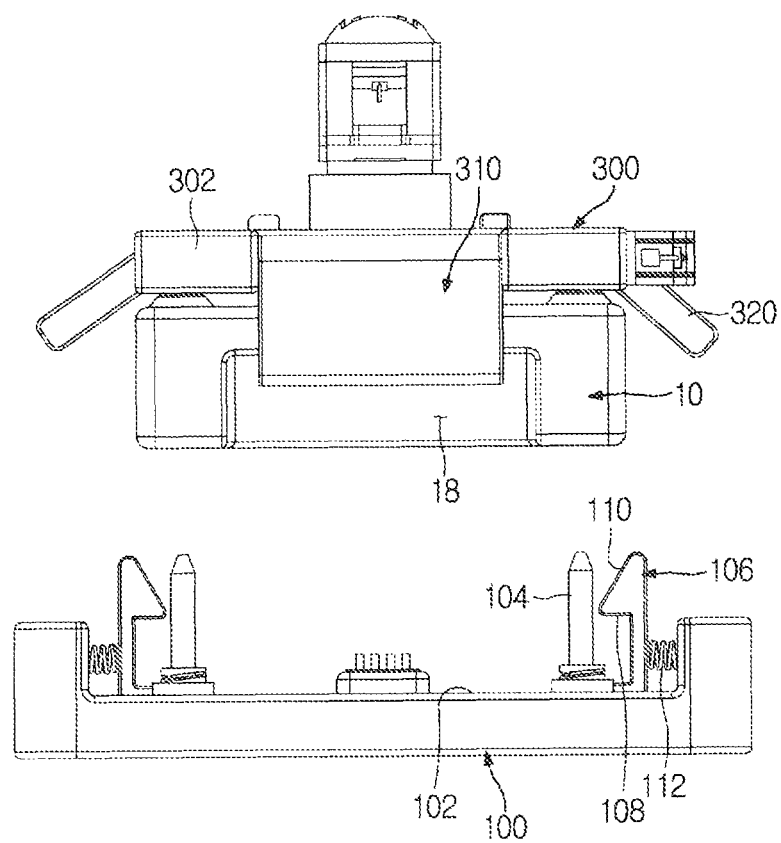

While the battery attaching/detaching unit 300 is grasping the battery 10, as shown in FIGS. 7 and 8, the disengaging units 320 of the battery attaching/detaching unit 300, which have been introduced into the upper surface incisions 14 of the battery 10, unfold outwards in response to electric signals. This is for the purpose of preventing interference with the grasping holders 106 which, when the battery 10 is lowered and mounted on the battery mounting unit 100, enter into the upper surface incisions 14 of the battery 10 and grasp them.

Figure 9:
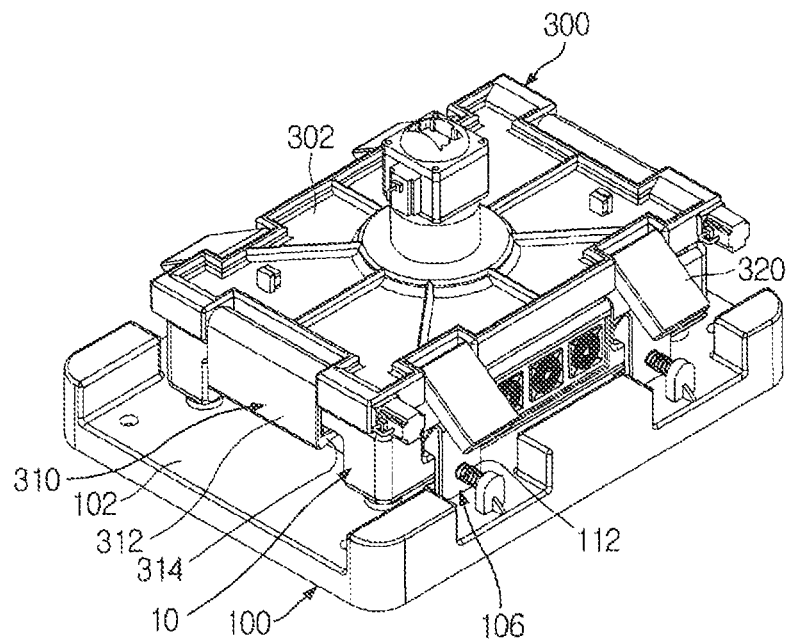
Figure 10:
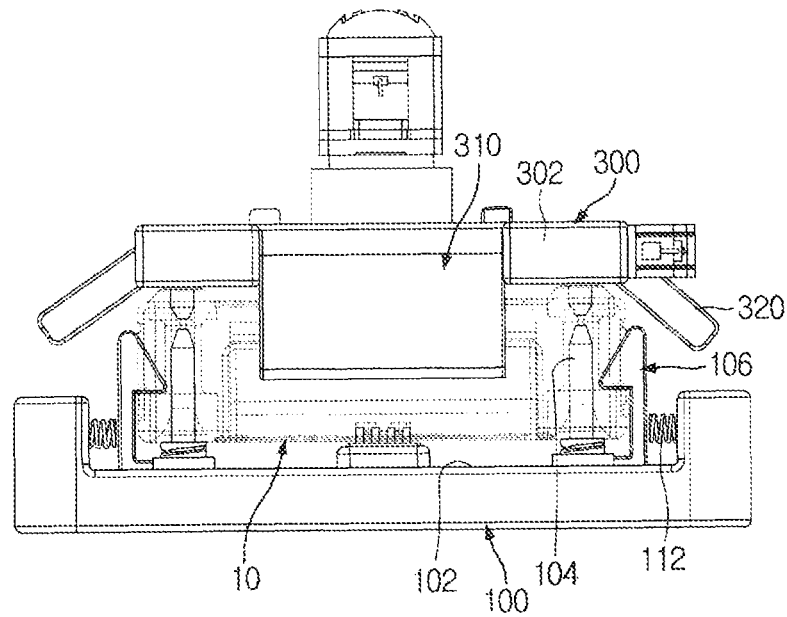

In this state, the movable rail 230 descends along Z-axis with regard to the variable guide rail 220. Then, as shown in FIGS. 9 and 10, the bottom portion of the battery 10, particularly the bottom portion below the engaging ledges 16 of the upper surface incisions 14 slides along the slanted surfaces 110 of the grasping holders 106 of the battery mounting unit 100 and keeps descending while unfolding the grasping holders 106 outwards.

At the same time, the engaging rods 104 of the battery mounting unit 100 are inserted into the coupling holes 12 of the battery 10.

The battery attaching/detaching unit 300 and the battery 10 keep descending to be seated on the bottom portion 102 of the battery mounting unit 100 so that the stepped portions 108 of the grasping holders 106 are positioned above the upper surface incisions 14 of the battery 10. Then, the grasping holders 106 are again folded inwards by elastic restoring force from the elastic members 112 until they stand upright. As a result, the stepped portions 108 of the grasping holders 106 are positioned horizontally on the engaging ledges 16 of the upper surface incisions 14 of the battery 10 and engage with them, thereby constraining vertical movement of the battery 10.

The engaging rods 104 of the battery mounting unit 100 are, as described above, inserted into the coupling holes 12 of the battery 10, which is constrained without moving in forwards/backwards/leftwards/rightwards.

Figure 11:
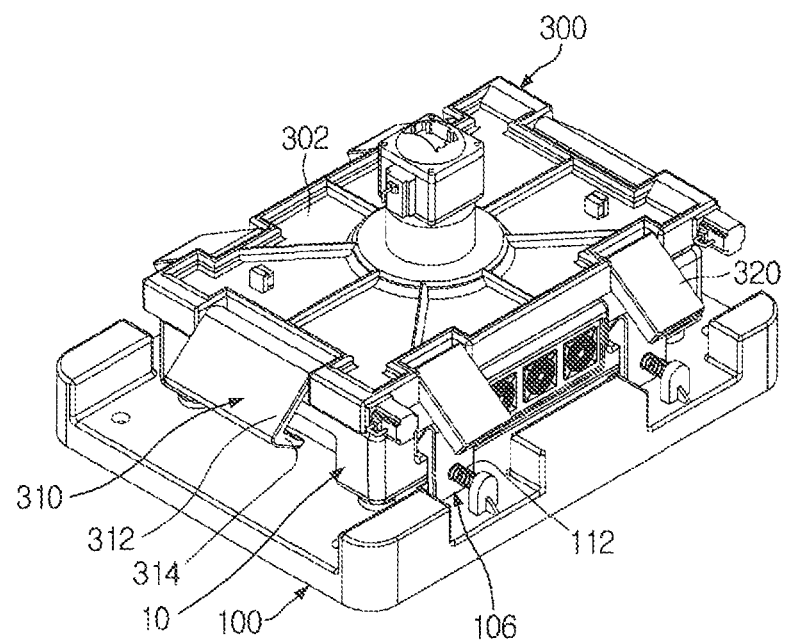
Figure 12:
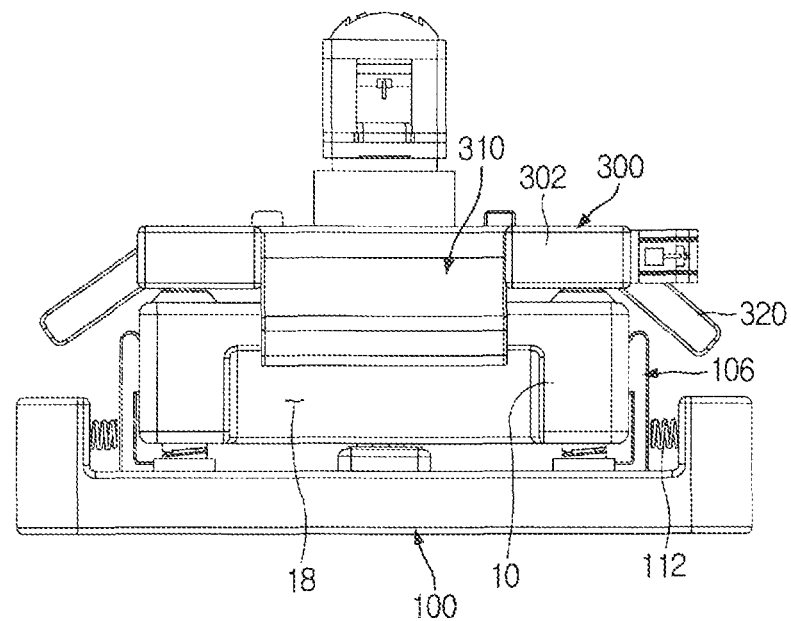
Figure 13:
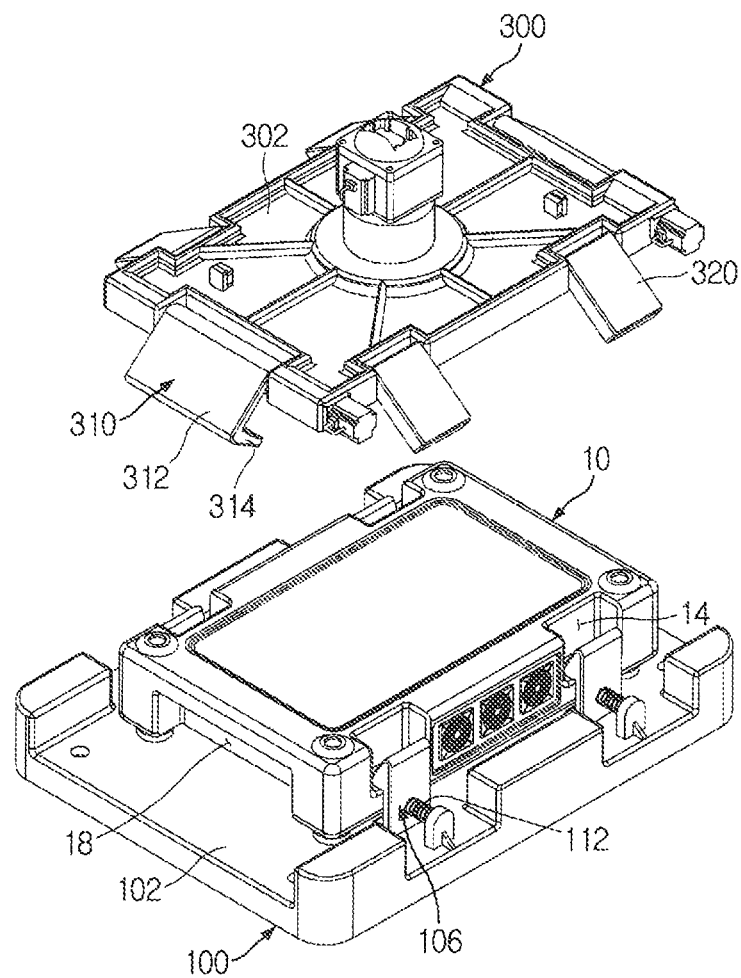

In this state, the grasping units 310 of the battery attaching/detaching unit 300 are hinge-rotated and unfolded outwards by electric signals, as shown in FIGS. 11-13, so that the horizontal portions 314 of the grasping units 310 disengage from the engaging ledges 20 of the lower surface incisions 18 of the battery 10. Then, the movable rail 230 ascends along Z-axis together with the battery attaching/detaching device while the completely-charged battery is retained and mounted on the battery mounting unit 100 of the bus 2.

Therefore, the discharged battery of the bus 2 can be easily and quickly exchanged with a fully-charged battery mounted on the battery stand of the loader.

Second Embodiment

Figure 14:
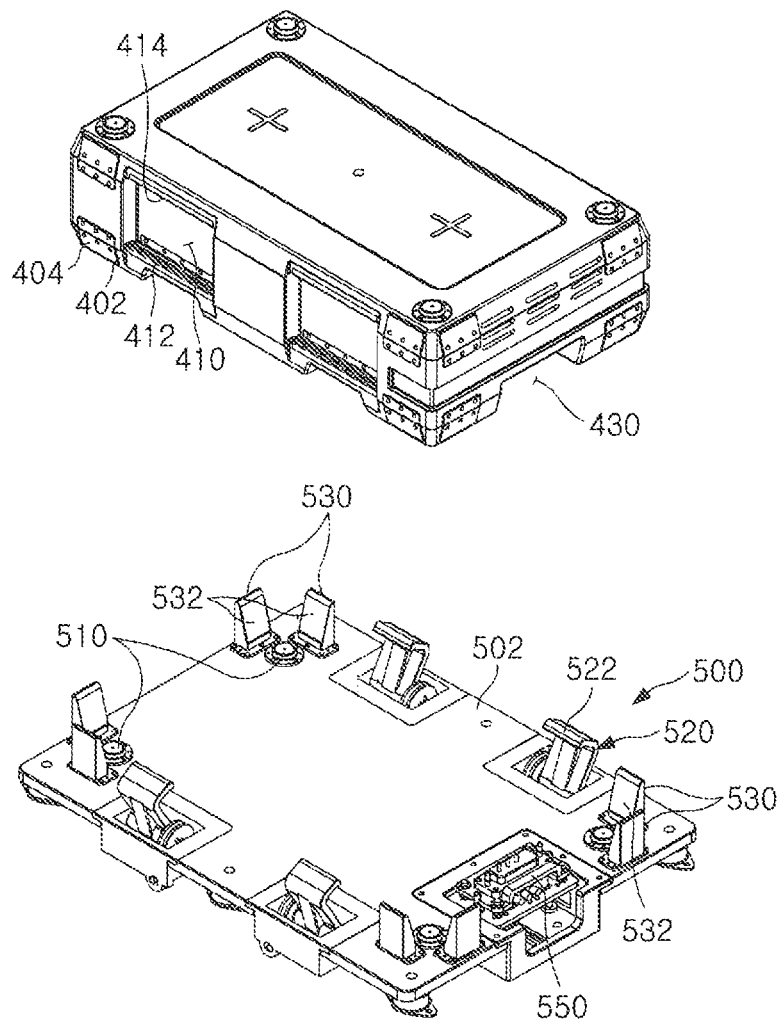
FIG. 14 is an exploded perspective view of a battery and a battery mounting unit of an electric vehicle battery attaching/detaching device according to a second embodiment of the present invention.
Figure 15:
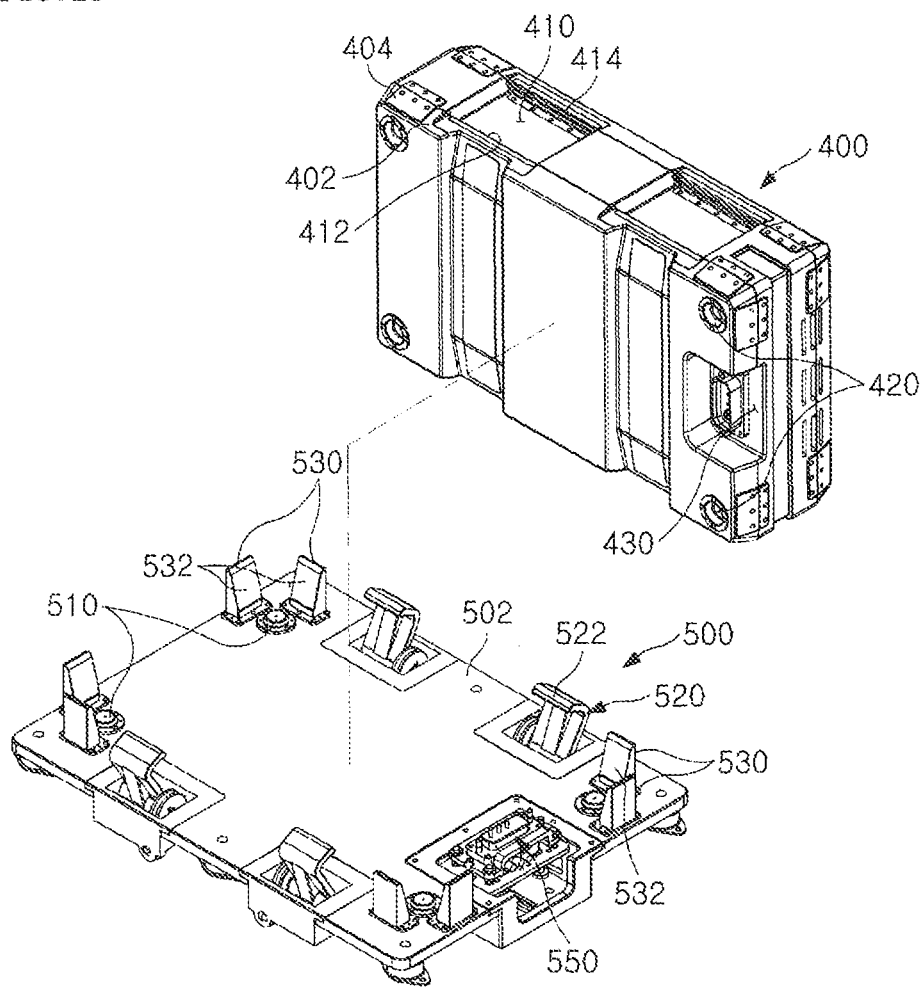
FIG. 15 is an exploded perspective view revealing the bottom structure of the battery shown in FIG. 14.
Figure 16:
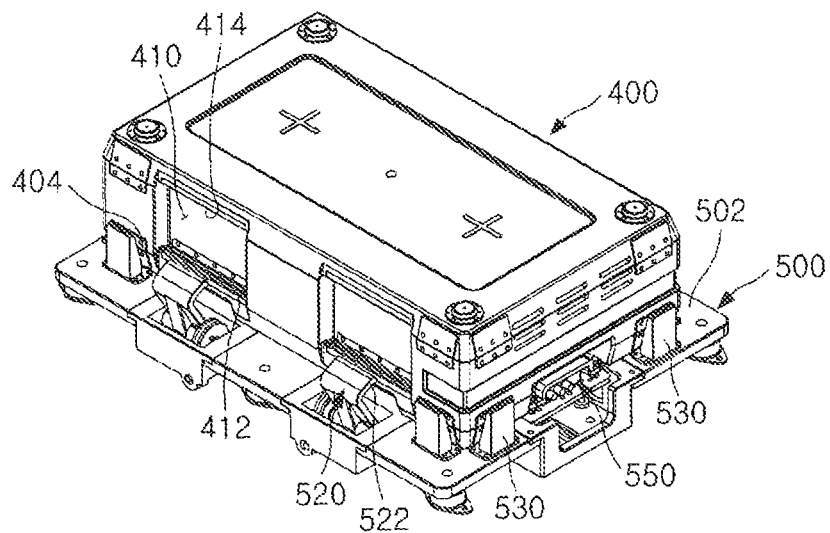
FIG. 16 is an assembled perspective view of FIG. 14.
Figure 17:
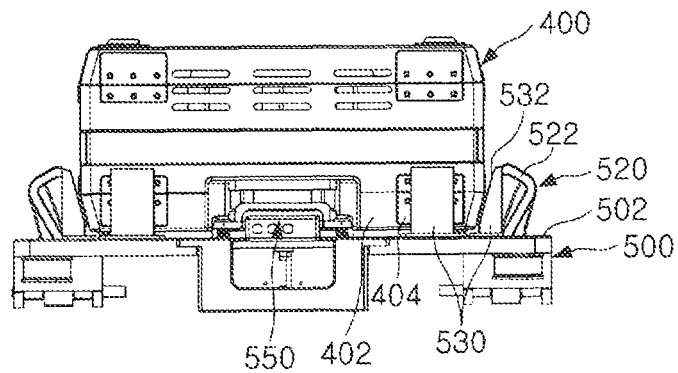
FIGS. 17 and 18 are front and lateral views of FIG. 16.
Figure 18:
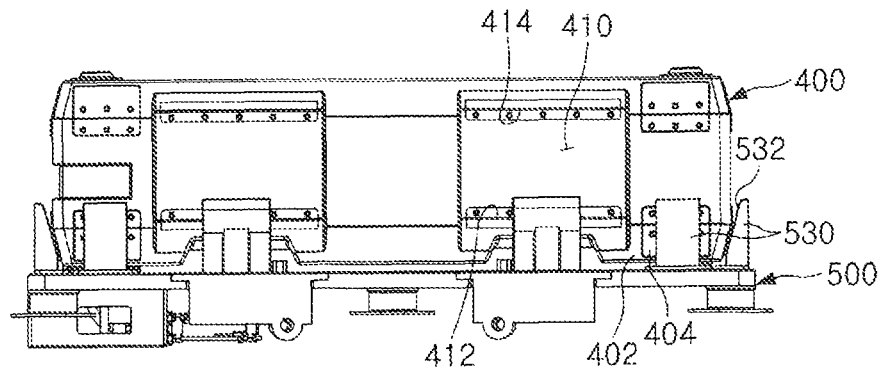

FIG. 14 is an exploded perspective view of a battery and a battery mounting unit of a electric vehicle battery attaching/detaching device according to a second embodiment of the present invention; FIG. 15 is an exploded perspective view revealing the bottom structure of the battery shown in FIG. 14; FIG. 16 is an assembled perspective view of FIG. 14; and FIGS. 17 and 18 are front and lateral views of FIG. 16.

As shown, the electric vehicle battery attaching/detaching device according to the second embodiment of the present invention includes a loader (not shown) having a plurality of batteries, charging of which has been completed (hereinafter, referred to as fully-charged batteries), loaded thereon; an electric vehicle battery mounting unit 500; and a battery attaching/detaching unit (not shown in the second embodiment) adapted to move between the battery mounting unit 500 and the loader along X-axis, Y-axis, and Z-axis by means of a movement device (not shown in the second embodiment), detach a battery mounted on the battery mounting unit 500 or the loader, and again exchange/mount the battery on the loader or the battery mounting unit 500.

It will be assumed in the description of the second embodiment of the present invention that the electric vehicle is a bus 2.

The battery attaching/detaching unit is supposed to move along X-axis, Y-axis, and Z-axis with regard to the loader, which has a plurality of fully-charged batteries loaded thereon, and the battery mounting unit 500 of the bus 2. To this end, the battery mounting unit 500 is preferably installed on top of the bus 2, and the loader of fully-charged batteries is preferably positioned higher than the bus 2.

The battery attaching/detaching unit is moved by the movement device along X-axis, Y-axis, and Z-axis with regard to the loader and the battery mounting unit 500 of the bus 2. The movement device has the same construction and functionality as the movement device 200 according to the first embodiment, and repeated description thereof will be omitted herein.

The construction according to the second embodiment of the present invention includes a battery attaching/detaching unit, a battery 400, and a battery mounting unit 500 or a battery stand, as in the case of the first embodiment, and the organic functionality is the same or substantially similar, except for detailed constructional differences for better operational effects, which will be described later in detail.

The structure of the battery 400, which is applied to the second embodiment of the present invention, will now be described.

The battery 400 applied to a battery attaching/detaching device according to the second embodiment of the present invention has cone-type recesses 420 of a small depth formed near respective corners, so that the battery 400 is retained at the accurate location on the battery mounting unit 500 of the bus 2 or on the battery stand of the loader. The battery 400 also has incision recesses 410 formed on both lateral surfaces, respectively, and each incision recess 410 has upper and lower engaging ledges 414 and 412 formed at a predetermined height from the bottom and top portions, respectively.

The cone-type recesses 420 have a cone shape, i.e. the interval is large at the entering end and decreases inwards.

The battery 400 has taper surfaces 402 formed on lower portions of respective lateral surfaces up to a predetermined height and inclined by a predetermined angle so that the sectional area decreases downwards. The inclination angle of the taper surfaces 402 is preferably about 10-20°, most preferably 15°.

The battery 400 has anti-wear cover plates 404 coupled to respective ends of front, rear, left, and right surfaces near the corners so as to straddle the surfaces by a predetermined interval. Particularly, the anti-wear cover plates 404 are coupled to respective ends of front, rear, left, and right surfaces of the battery 400, near the corners, so as to straddle the taper surfaces 402 and front, rear, left, and right surfaces near the upper portions of the taper surfaces 402 by a predetermined interval.

The anti-wear cover plates 404 are preferably made of a special alloy material having sufficient resistance to wear to endure frequent friction with guide pieces 530 of the battery mounting unit 500 (described later) and resulting heat.

Specifically, the anti-wear cover plates 404 are preferably adapted to be attached/detached to/from the battery so that they can solely be replaced when worn by frequent friction and resulting heat.

The battery 400 of the above-mentioned construction is mounted while being retained by the battery mounting unit 500 or the battery stand (described later).

The battery mounting unit 500 and the battery stand have the same construction, so the following description will be made only in connection with the battery mounting unit 500.

The battery mounting unit 500 has a bottom portion 502 of a predetermined area, on which a battery 400 is to be seated and supported. The bottom portion 502 has cone-type protrusions 510 of a small height formed to be inserted into the cone-type recesses 420 formed on corners of the bottom portion 402 of the battery 400.

The cone-type protrusions 510 have a cone shape, i.e. the interval is small at the front end but increases downwards.

Therefore, when the cone-type protrusions 510 of the battery mounting unit 500 are inserted into the cone-type recesses 420 of the battery 400, the fact that the front end of each cone-type protrusion 510 is narrower than the entering end of each cone-type recess 420 makes the introduction process easy, as will be described later.

The inclination angle of the cone-type recesses 420 and the cone-type protrusions 510 is preferably about 60°.

The battery mounting unit 500 has grasping holders 520 formed on both sides of the bottom portion 502 and adapted to engage with or disengage from the lower engaging ledges 412 of the battery incision recesses 410. The grasping holders 520 are adapted to rotate by a predetermined angle about the center axis, in response to electric signals, to engage with or disengage from the lower engaging ledges 412.

The grasping holders 520 have stepped portions 522 adapted to horizontally engage with the lower engaging ledges 412 formed on the incision recesses 410 of the battery.

The battery mounting unit 500 has guide pieces 530 installed near respective front, rear, left, and right corners of the bottom portion 502 to guide the battery 400 in such a manner that, when it descends to the battery mounting unit 500, they make contact with the anti-wear cover plates 404 of the battery 400 and cause the battery to be seated in the right position through sliding.

Each guide piece 530 has a slanted surface 532 formed on its inner surface at the same angle as the taper surface 402 of the battery, i.e. 10-20°.

Therefore, as shown in FIGS. 17 and 18, when the battery 400 is seated on the battery mounting unit 500 or the battery stand, the cone-type protrusions 510 are inserted into the cone-type recesses 420 of the battery and prevent the battery 400 from moving horizontally forwards/backwards/leftwards/rightwards, and the stepped portions 522 of the grasping holders 520 horizontally engage with the lower engaging ledges 412 of the battery incision recesses 410 and prevent the battery 400 from moving vertically upwards/downwards, so that the battery 400 remains retained and grasped.

The battery attaching/detaching unit, although not separately shown in the second embodiment, is installed on the lower end of the movable rail to move along X-axis, Y-axis, and Z-axis, and may include a main unit having a shape and a size corresponding to those of the battery 400 and grasping units formed on both lateral surfaces of the main unit, respectively, and adapted to make hinge rotation vertically and horizontally in response to electric signals.

The grasping units are positioned to vertically correspond to the incision recesses 410 of the battery 400 and have the corresponding number. Each grasping unit may include a vertical unit adapted to make hinge rotation vertically or horizontally in response to an electric signal and a horizontal unit extending from an end of the vertical unit in a perpendicular direction. The horizontal units horizontally engage with the upper engaging ledges 414, which are formed on the incision recesses 410 of the battery 400, when the grasping units are folded, and thus grasp the battery 400.

An operational process of exchanging a battery, which is retained and mounted on the battery mounting unit 500 of the bus 2 or the battery stand of the loader, using the battery attaching/detaching device of the above-mentioned construction will now be described.

It is to be noted that the battery mounting unit 500 of the bus 2 and the battery stand formed on the loader have the same structure, as mentioned above, meaning that the structure that mounts a battery 400 in FIGS. 14-18 is either the battery mounting unit 500 of the bus 2 or the battery stand formed on the loader, but the following description will be limited to the battery mounting unit 500 of the bus 2, for convenience of description.

While the battery attaching/detaching unit is grasping the battery 400, the movable rail moves along Z-axis, X-axis, and Y-axis to position it on the same vertical line above the battery mounting unit 500 of the bus 2.

However, it is very likely that the battery mounting unit 500 of an electric vehicle may not be positioned on the same vertical line with the battery attaching/detaching unit of the movement device but displaced to some extent for various reasons, e.g. tire air pressure difference, concentrated distribution of passengers, the driver's difficulty in stopping the electric vehicle at the accurate exchange location, etc.

Therefore, even if the battery 400, which is grasped by the battery attaching/detaching unit, and the battery mounting unit 500 are not located on the same vertical line but are displaced to some extent, the descending battery attaching/detaching unit can mount the battery 400 on the battery mounting unit 500 as long as the degree of displacement is within a predetermined tolerance range.

Obviously, if the degree of displacement between the battery attaching/detaching unit, which grasps the battery 400, and the battery mounting unit 500 is outside the predetermined tolerance range, the bus needs to be driven and stopped again, without lowering the battery attaching/detaching unit, to be within the tolerance range.

Assuming that the degree of displacement between the battery attaching/detaching unit, which grasps the battery 400, and the battery mounting unit 500 is within the tolerance range, as mentioned above, the movable rail descends along Z-axis with regard to the variable guide rail. If the periphery of the bottom portion of the battery 400 is positioned inside the guide pieces 530, which are installed near respective corners of the battery mounting unit 500, and if at least one part makes contact, the battery attaching/detaching unit releases the battery 400, which then descends due to its own weight.

Then, as shown in FIGS. 14, 16, 17, and 18, the anti-wear cover plates 404, which straddle the taper surfaces 402 near respective corners of the battery 400 and lateral surfaces, slide along the slanted surfaces 532 of the guide pieces 530 installed near respective corners of the bottom portion 502 of the battery mounting unit 500 so that the battery 400 and the battery mounting unit 500 are positioned in place, i.e. positioned on the same vertical line, and seated.

At the same time, the cone-type protrusions 510 of the battery mounting unit 500 are inserted into the cone-type recesses 420 of the battery 400.

The bottom portion of the battery 400 has taper surfaces 402 formed on lower portions of the lateral surfaces so that the sectional area of the bottom portion decreases downwards, as described above. Respective guide pieces 530 formed near respective corners of the bottom portion 502 of the battery mounting unit 500 also have slanted surfaces 532, so that the sectional area joining the upper ends is larger than the sectional area of the bottom portion of the battery. As a result, even if the battery 400 is slanted or twisted with regard to the same vertical line shared by the battery mounting unit 500 within a predetermined tolerance range, the battery 400 can be introduced and accurately set up.

The fact that the interval of the front end of each cone-type protrusion 510 of the battery mounting unit 500 is smaller than the entering end of each cone-type recess 420 of the battery 400 makes the introduction easy.

After the battery 400 is seated at the accurate location on the bottom portion 502 of the battery mounting unit 500, the grasping holders 520 of the battery mounting unit 500 are folded inwards by power means to reach an upright position. Then, the stepped portions 522 of the grasping holders 520 are horizontally positioned on top of the lower engaging ledges 412 of the incision recesses 410 of the battery 400 and engage with them, thereby constraining vertical movement of the battery 400.

A process of mounting the battery 400 onto the battery mounting unit 500, when the battery attaching/detaching unit, which is grasping the battery 400, and the battery mounting unit 500 are displaced from the same vertical line within a predetermined tolerance range, has been described. However, no process of detaching the battery 400 from the battery mounting unit 500 using the battery attaching/detaching unit has been described. This is because the battery attaching/detaching unit has no difficulty in picking up the battery, as long as the displacement from the same vertical line is within a predetermined tolerance range, in which case the grasping units can fold and engage with the upper engaging ledges 414 of the incision recesses 410 of the battery 400.

As such, the electric vehicle battery attaching/detaching device according to the second embodiment of the present invention can easily exchange a discharged battery of a bus 2 with a fully-charged battery on the battery stand of the loader within a short period of time.

Meanwhile, when the battery 400 is seated on the battery mounting unit 500, electric connection needs to be established to supply the electric vehicle with electricity stored in the battery 400. Such electric connection is typically established by inserting a connector pin, which protrudes from the battery mounting unit 500, into a connector pin hole formed on the bottom portion of the battery.

It has been noted above that, in the case of the electric vehicle battery attaching/detaching device according to the second embodiment of the present invention, even if the battery mounting unit 500 of an electric vehicle is not positioned on the same vertical line with the battery attaching/detaching unit of a movement device but is displaced to some extent for various reasons (tire air pressure difference, concentrated distribution of passengers, the driver's difficulty in stopping the electric vehicle at the accurate exchange location, etc.), the battery 400 can be easily attached/detached to/from the battery mounting unit 500.

In other words, the battery mounting unit 500 is typically provided with a connector pin, which is inserted into a connector pin hole formed on the bottom portion of the battery 400, when the battery 400 is lowered and seated. However, if the battery 400 is displaced to some extent vertically and horizontally without being positioned on the same vertical line with the battery mounting unit 500 and then lowered to be seated, the connector pin cannot be easily introduced into the connector pin hole. This may interfere with the seating process. Furthermore, the connector pin may be bent or even broken due to the weight of the battery 400.

Considering this, according to the second embodiment of the present invention, a connector pin 552, which is installed on the battery mounting unit 500 and adapted to ascend/descend, is controlled to ascend, only if the battery 400 is seated and set in the accurate position on the battery mounting unit 500, and then inserted into the connector pin hole 432 of the battery 400 to establish stable electric connection between the battery 400 and the battery mounting unit 500.

Figure 19:
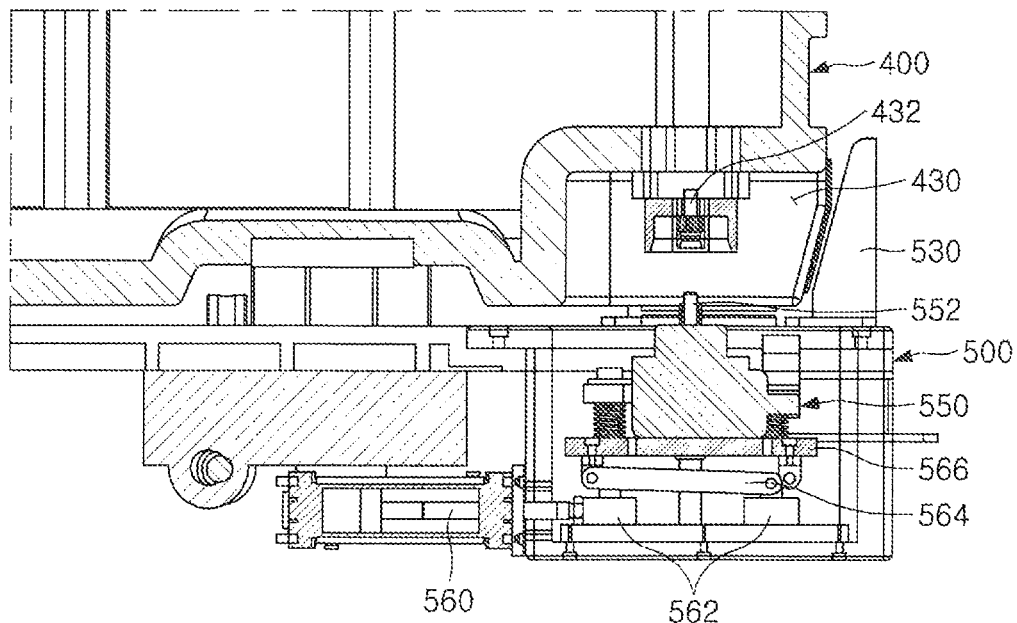
FIGS. 19 and 20 are sectional constructional views illustrating a process of inserting connector pins, which are installed on one side of the bottom of a battery mounting unit so as to ascend/descend, into connector pin holes of a battery in connection with the electric vehicle battery attaching/detaching device according to the second embodiment of the present invention.
Figure 20:
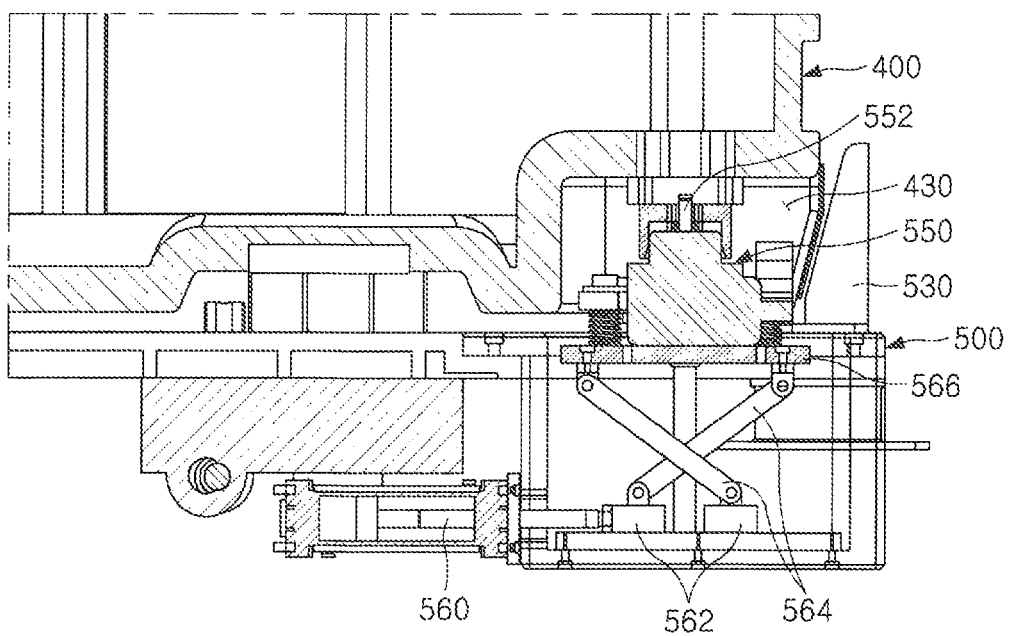
Figure 21:
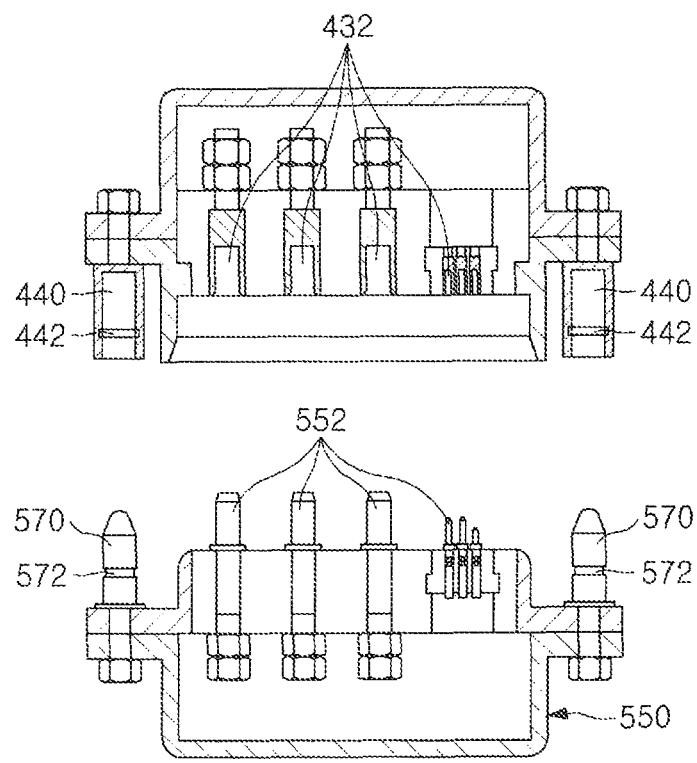
FIGS. 21 and 22 are sectional constructional views showing the process of inserting connector pins into connector pin holes, which is shown in FIGS. 19 and 20, from a different direction.
Figure 22:
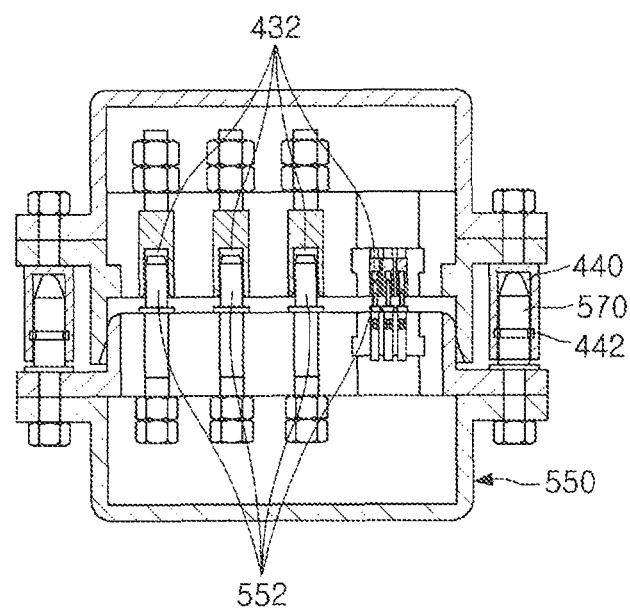

FIGS. 19 and 20 are sectional constructional views illustrating a process of inserting connector pins, which are installed on one side of the bottom of a battery mounting unit so as to ascend/descend, into connector pin holes of a battery in connection with an electric vehicle battery attaching/detaching device according to the second embodiment of the present invention, and FIGS. 21 and 22 are sectional constructional views illustrating the process of inserting connector pins into connector pin holes, which is shown in FIGS. 19 and 20, from a different direction.

As shown in FIGS. 14-22, a connector pin module 550 is installed beneath the bottom portion of the battery mounting unit 500 and adapted to ascend/descend. An introduction space unit 430 is formed on one side of the bottom portion of the battery 400 to provide the connector pin module 550, when ascending, with an introduction space. Connector pin holes 432 are formed near the bottom of the introduction space unit 430 so as to correspond to connector pins 552 of the connector pin module 550.

The connector pin module 550 has a plurality of connector pins 552 installed thereon, as shown in FIGS. 21 and 22, and grasping protrusions 570 formed on both sides of the connector pins 552.

Grasping holes 440 are formed on both sides of the connector pin holes 432 so as to correspond to the grasping protrusions 570.

A leaf spring 442 is installed inside each grasping hole 440 along a circumferential portion, and a fitting groove 572 is formed around a circumferential portion of each grasping protrusion 570 so that the leaf spring 442 is fitted thereto.

The connector pin module 550 is lifted/lowered by a lifting/lowering means (e.g. actuator). Particularly, the connector pin module 550 is supported by a stand 566, which is connected to a plurality of links 564, which are connected to a slide member 562 connected to an end of a piston 560 of the actuator.

Therefore, when an electric signal is applied to the actuator, the piston 560 moves laterally and makes the slide member 562 slide as shown in FIG. 20. The links 564 then rotate from the horizontal to vertical direction and lift the stand 566 and thus the connector pin module 550.

In other words, when the battery 400 is seated in the accurate position on the battery mounting unit 500, a corresponding signal is applied to the actuator. Then, the piston 560 of the actuator, the slide member 562, and the links 564 operate and lift the connector pin module 550, the connector pins 552 of which are inserted into the connector pin holes 432 of the battery 400 to establish electric connection.

The grasping protrusions 570, on both sides of the connector pin module 550, are also inserted into the grasping holes 440 formed on both sides of the connector pin holes 432. The leaf springs 442 of the grasping holes 440 click and fit into the fitting grooves 572 of the grasping protrusions 570, so that the connector pins 552 remain inserted into the connector pin holes 432 firmly. This means that, even if vibration occurs during running of the electric vehicle, the connector pins 552 do not easily escape from the connector pin holes 432 but maintain stable electric connection.

On the other hand, when the battery 400 is to be exchanged, an electric signal is applied to the lifting/lowering means (actuator) to lower the connector pin module 550 so that the connector pins are released from the connector pin holes 432. The battery can then be exchanged.

Technical ideas described in connection with embodiments of the present invention can be implemented independently or in combination. Although embodiments of the present invention have been described and illustrated, they are intended to be exemplary only, and various modifications and equivalents thereof will be obvious to those skilled in the art. The technical scope of the present invention is to be defined by the accompanying claims.

The invention claimed is:

1. An electric vehicle battery attaching/detaching device for replacing a battery mounted on an electric vehicle with a fully-charged battery mounted on a battery stand of a loader, comprising:
- a battery mounting unit formed on the electric vehicle to detachably mount the battery thereon and provided with a connector pin module adapted to be lifted/lowered by a lifting/lowering means; and
- a battery attaching/detaching unit adapted to i) move along X-axis, Y-axis, and Z-axis between the battery mounting unit and the battery stand by means of a movement device, ii) detach the battery mounted on the battery mounting unit, and iii) mount the fully-charged battery on the battery mounting unit,
- wherein the battery has an introduction space unit formed on a side of a bottom surface of the battery so that the connector pin module is introduced in the introduction space unit when lifted.

2. The electric vehicle battery attaching/detaching device as claimed in claim 1, wherein the battery has a connector pin hole formed on a surface of the introduction space unit so that a connector pin of the connector pin module is inserted into the connector pin hole.

3. The electric vehicle battery attaching/detaching device as claimed in claim 2, wherein grasping protrusions are formed on both sides of the connector pin, a fitting groove being formed on a circumferential surface of each grasping protrusion, and grasping holes are formed on both sides of the connector pin hole so that the grasping protrusions are fitted, a leaf spring being installed on a circumferential surface of each grasping hole to be fitted into the fitting groove.

4. An electric vehicle battery attaching/detaching device for replacing a battery mounted on an electric vehicle with a fully-charged battery mounted on a battery stand of a loader, comprising:
- a battery mounting unit formed on the electric vehicle to detachably mount the battery thereon and provided with a connector pin module adapted to be lifted/lowered by a lifting/lowering means; and
- a battery attaching/detaching unit adapted to i) move along X-axis, Y-axis, and Z-axis between the battery mounting unit and the battery stand by means of a movement device, ii) detach the battery mounted on the battery mounting unit, and iii) mount the fully-charged battery on the battery mounting unit,
- wherein the lifting/lowering means comprises:
- an actuator adapted to operate in response to an electric signal;
- a piston adapted to be moved by operation of the actuator;
- a slide member connected to an end of the piston so that movement of the slide member is interlinked with movement of the piston; and
- links having ends connected to the slide member, respectively, so that, when the slide member moves, the links rotate from a horizontal direction to a vertical direction or from a vertical direction to a horizontal direction and lift/lower the connector pin module.

* * * * *